Aug. 18, 1931.   S. SHIMIZU   1,819,797
MAGNETOMETER
Filed June 11, 1924
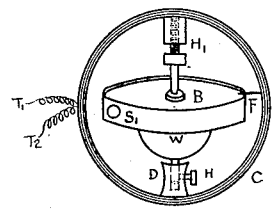
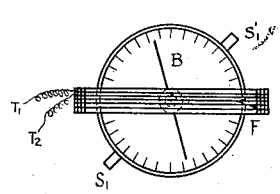
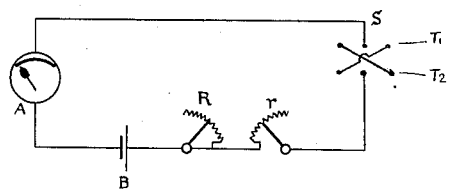
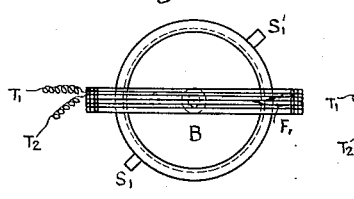
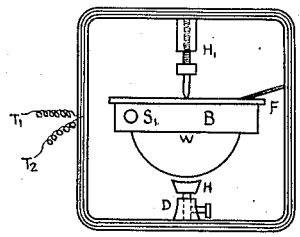
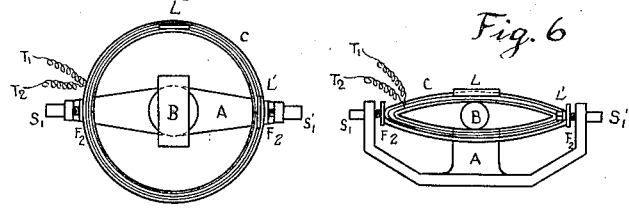
Inventor:-
Seizo Shimizu,
By Lewis J. Doolittle,
Atty.

Patented Aug. 18, 1931

1,819,797

UNITED STATES PATENT OFFICE

SEIZO SHIMIZU, OF TOKYO, JAPAN

MAGNETOMETER

Application filed June 11, 1924, Serial No. 719,300, and in Japan April 28, 1923.

The present invention relates to a magnetometer or an apparatus for determining a magnetic field for the adjustment of the compass which is placed at a desired point in a ship and more particularly to such apparatus which produces a suitable magnetic field due to electric current passing through a coil equipped at the desired point and whereby the strength of the magnetic field at that point is to be determined from both the direction of the resultant magnetic field and the known strength of the magnetic field due to the current in the coils. The present invention consists of means by which the horizontal component and the vertical component of the magnetic field can be measured respectively by the coil.

The object of the invention is to obtain an apparatus for determining the horizontal and vertical components of a magnetic field for the magnetic compass adjustment by which the strength of the magnetic field can be accurately, conveniently, and promptly measured, instead of using the ordinary deflector and the heeling adjuster, the result being free from the error due to the change of the strength of permanent magnets.

The invention will now be described with reference to the accompanying drawings, in which:—

Fig. 1 is a perspective view of an apparatus for measuring a horizontal component magnetic field, embodying the present invention;

Fig. 2, the plan of Fig. 1;

Fig. 3 is a diagram of the electrical connection used in the apparatus;

Fig. 4, a perspective view of a modification of the apparatus shown in Fig. 1;

Fig. 5, the plan of the same;

Fig. 6, a perspective view of an apparatus for measuring a vertical component of magnetic field, embodying the present invention;

Fig. 7, the plan of the same.

*A. Apparatus for horizontal component of a magnetic field*

A coil $c$ of a suitable size, as shown in Fig. 1, is vertically supported by a gimbal in the binnacle from which the compass bowl has previously been removed and in the coil is secured in a horizontal position a small compass whose lubber's line is coincident with the midship line. The magnetic needle of the compass is a few centimeters in length and the needle has an aluminium needle indicator attached perpendicularly to it. The compass is made conveniently to read a course of the ship by the graduation from 0° to 360°, taking the lubber line as 0°. The coil is rotatable about a vertical axis perpendicular to the centre of the compass card and is secured by means of set screw as is indicated with $H_1$ in the drawings. The angle of rotation of the coil is easily found by means of a needle F and hence it indicates an angle between the magnetic field and the plane of the coil, by either the said graduation inside of the compass bowl or another graduation on the surface of it, such as shown in Fig. 2. To measure the horizontal component of the magnetic field, first set the coil C a suitable, certain angle relative to the magnetic needle, connect the respective ends $T'_1$ and $T'_2$ of the circuit, as shown in Fig. 3, to the corresponding ends $T_1$ and $T_2$ of the coil, and then an electric current is passed through the coil through the reversing switch $s$, so that the magnetic needle can be brought exactly in the plane of the coil. Then the strength of the current at this time should be read. Then the product of the sine of a deflected angle of the magnetic needle and the strength of the original magnetic field at that point is proportional to the strength of the magnetic field due to the said current in the coil. The proportional constant can be found by a test carried out in a known magnetic field. This constant is a function of the coil, and invariable as long as the form remains unchanged. Therefore the strength of the magnetic field can easily be calculated with such constant.

W, shown in Fig. 1, designates a poise which lowers the centre of gravity of the compass bowl and keeps it horizontal; D and H are pivot mountings for the bowl; $S'_1$, pivots to be attached to the gimbal; and H provides an adjustment for the height of the coil. R and $r$, as shown in Fig. 3, are regulating rheostats for the rough and fine adjustment of the current; B, a battery; A, an ammeter; S, a reversing switch.

To measure the strength of the magnetic field at this point by employing the ordinary navigation compass, a coil C is provided in a definite form such as a rectangular or a suitably curved shape corresponding to the compass bowl and placed so as to bring its centre to coincide with the centre of the magnetic needle, as shown in Fig. 4, and to let the coil C be easily rotatable about a vertical axis passing through the centre of the compass card and also to be fixed in position by means of a set screw and pivotal mounting in the upstanding base plug D at any time, if desired. An indicating needle $F_1$ being fixed to the coil shows the angle between the direction of the magnetic needle and plane of the coil, by means of the graduation upon the compass bowl or the compass card. Let a certain angle be had between the magnetic needle and the plane of the coil; connect the respective ends $T'_1$ and $T'_2$ of the circuit, as shown in Fig. 3, to the corresponding ends $T_1$ and $T_2$ of the coil as in the former case; close the switch and pass an electric current through the coil, so as to bring the magnetic needle parallel to the plane of the coil by adjusting the current with the regulating rheostats R and $r$; and take reading of the strength of the current. The ratio of the strength of the current to the sine of the angle being proportional to a required strength of the field which can be easily calculated, if this proportional constant has been determined once in a known magnetic field as in the former case.

If the angle of a deflection be made always constant, and measurements were made, and then a table or a diagram prepared with respect to the electric current and magnetic fields of various strengths, the strength of the magnetic field corresponding to any electric current can be readily found therefrom.

$H_1$, as shown in Fig. 4, is understood to serve in the same way as shown in Fig. 1, previously described.

*B. Apparatus for the vertical components of a magnetic field.*

Instead of determining the comparative measurement of the vertical component of the magnetic field by shifting a small weight attached to the needle of the heeling adjuster to bring the magnetic needle in the horizontal plane, a circular coil C of a suitable size, as shown in Fig. 6, is horizontally supported by means of small nuts $F_2$ and pivots $S_1$ and $S'_1$ on the gimbal, the compass bowl of the binnacle being removed, and its position is corrected by the levels L and $L^1$ and a magnetic needle, like the one of the heeling-adjuster in construction, is placed at its centre, the needle being fixed by making it substantially parallel to the direction of the field. A is the supporting base of the magnetic needle. The respective terminal ends $T'_1$ and $T'_2$ are connected in the circuit shown in the diagram Fig. 3, and an electric current is then passed through the coil. The magnetic needle is brought to a horizontal position by adjusting the rheostats R and $r$. Taking the reading of the strength of the electric current $i$ at this time, we have the following relation:—

$$ml\ (Z' \pm Z_1) = wp\ \text{sine}\ \epsilon$$

where $Z^1$ is the vertical component of the original magnetic field at a given point; $Z_1$, a vertical magnetic field component due to the electric current passing through the coil C; $m$, strength of the pole of the magnetic needle; $l$, distance between its poles; $w$, its weight; $p$, distance between the centre of gravity of it and its point of suspension (not shown in the drawings); $\epsilon$, an angle between the straight line joining the point of suspension and the centre of gravity of the magnetic needle and the vertical line. The sign of $Z_1$ is either positive or negative depending on the relative direction of $Z^1$.

The vertical components $Z_1$ of the magnetic field due to the coil is equal to $Ki$, where K is constant due to the coil C. Whenever the magnetic needle is horizontal the total magnetic moment is equal to $wp$ sine $\epsilon$. Hence if the magnetic needle is once adjusted so that it becomes horizontal in a known vertical magnetic field component $Z_0$, we have $$wp\ \text{sine}\ \epsilon = ml Z_0$$
Therefore, $Z^1 \pm Z_1 = Z_0$,
or $Z^1 = Z_0 \pm Ki$ So the value of $Z^1$ is found if that of K is known.

The determination of K is as follows:—

Bring the magnetic needle to a horizontal position by passing an electric current, $i_0$, through the coil in another magnetic field, with a known vertical component, $Z^1_0$, which is different from the above mentioned field, $Z_0$. Then:—

$Z^1_0 \pm K i_0 = Z_0$, from which $$K = \frac{Z_0 \sim Z^1_0}{i_0}$$

Also, $Z^1 = Z_0 \mp Ki$ being a straight line with respect to $Z^1$ and $i$; $Z^1$ can easily be found from the value of $i$ with either a provisional linear diagram between $Z^1$ and $i$ or a table relating to $Z^1$ and $i$.

The apparatus for determining the magnetic field for adjustment of the ship's compass provides means by which the magnetic field may be easily and accurately measured, by separately measuring the intensity of the horizontal and vertical components of such field. The ordinary method of measuring a magnetic field involves the use of either the ballistic galvanometer by magnetic induction or deflection of the magnetic needle of a tangent galvanometer, while, in the use of the apparatus embodying the present invention, a magnetic needle is made to rest in a magnetic field which is to be measured and the plane of the coil fixed at some angle less than 90 degrees to a plane perpendicular to the magnetic field, then passing a current through the coil sufficient to bring the needle exactly in the plane of the coil and, by measuring the strength of the current at that moment, determining the intensity of the field. When the ship's compass is required to be adjusted for error due to the ship's magnetism, etc., and when a mark on the ground, the sun or a star can not be taken to determine the deviation of the compass, the adjustment is made by measuring the horizontal component of the magnetic field at the point where the ship's compass is located. This measurement of the magnetic field may readily be made with the present apparatus and an accurate result obtained. It is also necessary to measure the vertical component of the field in the ship when the heeling error of the ship's compass is to be adjusted. The present apparatus may also be used to measure this vertical component of the field very conveniently and the measurement is accurate.

It will thus be seen that the present apparatus provides a necessary auxiliary means for the determination of the adjustment of the ship's compass and that it is not intended to actually neutralize the deviations for the direct adjustment of the error of the ship's compass but as an auxiliary device to determine the necessary adjustments of the compass.

What I claim is:

1. A magnetometer for determining a magnetic field for the adjustment of a magnetic compass, comprising a coil of predetermined size through which current is passed to set up a magnetic field, means for measuring the current through the coil, a magnetic compass horizontally positioned in the field of the coil and provided with a vertically adjustable mounting rotatable about a vertical axis, and indicating means for determining the several adjustments of said compass.

2. A magnetometer for determining and measuring a magnetic field for the adjustment of a magnetic compass, comprising a coil adjustably positioned in a plane at substantially right angles to the magnetic field to be determined and measured, means for passing a regulated amount of current through said coil, a magnetic needle positioned in the center of said coil, and means for measuring the current through said coil.

In testimony whereof, I affix my signature.

SEIZO SHIMIZU.